United States Patent [19]

Liepelt

[11] 4,339,262

[45] Jul. 13, 1982

[54] COOLING APPARATUS FOR FLOAT-GLASS INSTALLATION

[75] Inventor: Eberhard Liepelt, Stolberg-Breinig, Fed. Rep. of Germany

[73] Assignee: Saint-Gobain Vitrage, Aubervilliers, France

[21] Appl. No.: 240,408

[22] Filed: Mar. 4, 1981

[30] Foreign Application Priority Data

Mar. 8, 1980 [DE] Fed. Rep. of Germany ....... 3008960

[51] Int. Cl.$^3$ ............................................. C03B 18/22
[52] U.S. Cl. .................................... 65/182.1; 65/99.6; 65/182.4
[58] Field of Search .................... 65/99.6, 182.1, 182.4

[56] References Cited

U.S. PATENT DOCUMENTS

| | | | |
|---|---|---|---|
| 3,222,154 | 12/1965 | Pilkington | 65/182.4 X |
| 3,333,936 | 8/1967 | Warren | |
| 3,589,886 | 6/1971 | Montgomery | |
| 3,622,299 | 11/1971 | Swillinger | |
| 3,649,237 | 3/1972 | Classen et al. | |
| 4,204,856 | 5/1980 | Yigdall et al. | 65/182.1 X |
| 4,255,180 | 3/1981 | Wolfe | 65/182.1 |

FOREIGN PATENT DOCUMENTS

| | | |
|---|---|---|
| 1596430 | 7/1970 | Fed. Rep. of Germany . |
| 1596501 | 3/1971 | Fed. Rep. of Germany . |
| 1604875 | 4/1972 | France . |
| 1283022 | 7/1972 | United Kingdom . |
| 1441915 | 7/1976 | United Kingdom . |

*Primary Examiner*—Arthur D. Kellogg
*Attorney, Agent, or Firm*—Pennie & Edmonds

[57] ABSTRACT

A cooling apparatus for a float-glass installation formed by a pair of pipes providing a path of circulation for a refrigerant adapted to extend through a sidewall of the installation to extend at least partially across a transverse dimension of a ribbon of glass moving along a path, as supported by a molten bath. Insulation means surrounds the pipes along a length from the point of entry to a transition point defining an insulated length and a non-insulated length of pipes. The insulation means and the pipes are movable relative to one another to relocate the transition point as determined by the dimension of the ribbon of glass to be produced.

12 Claims, 3 Drawing Figures

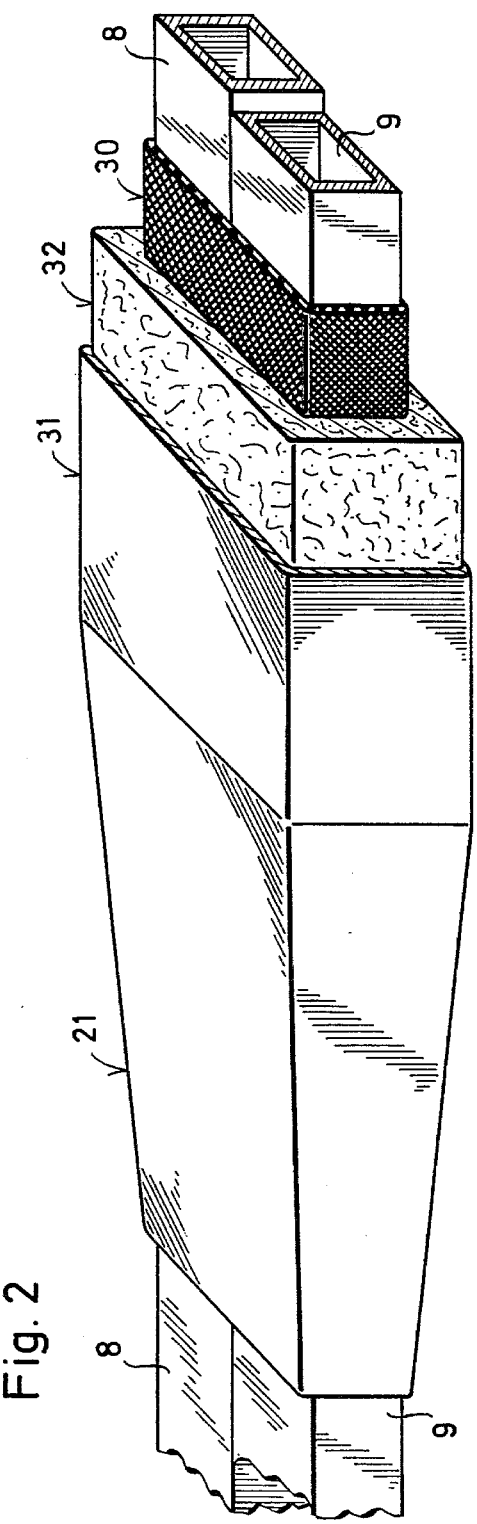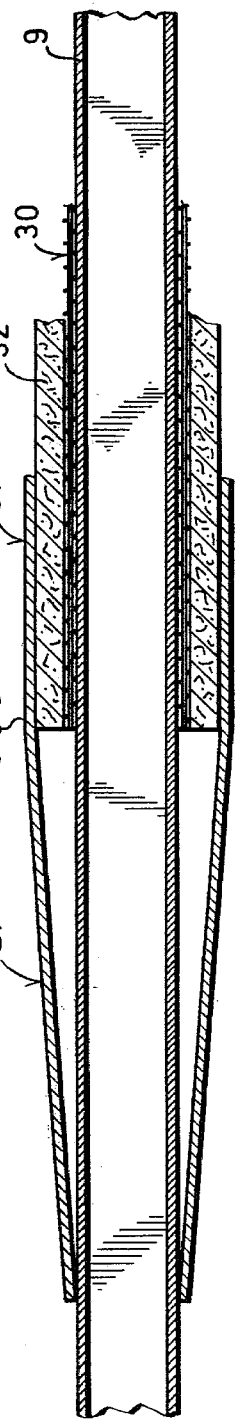

COOLING APPARATUS FOR FLOAT-GLASS INSTALLATION

TECHNICAL FIELD

The invention is directed to cooling apparatus for use in a float-glass installation to provide cooling preferably within the vicinity of the middle of the ribbon of glass as it moves through the installation, and thereby eliminate or substantially reduce temperature gradients across the glass ribbon from the middle region outward toward each of its edges.

BACKGROUND ART

The fabrication of ribbons of glass by a float-glass technique is well-known. It is also known that cooling devices are utilized with the float-glass installation for purposes of cooling the glass ribbon either exclusively or preferably within the vicinity of its mid-region. Cooling within the mid-region has been found to be necessary to eliminate or substantially reduce any temperature gradient as may occur across the ribbon of glass and which otherwise may prevent the formation of a uniform ribbon of glass. To this end, cooling is carried out within the region which is less effected by heat losses through the sidewalls of the installation.

One cooling apparatus that is known in the prior art is formed by a container arranged centrally over the ribbon of glass. The container is of fixed dimension and includes a number of connecting lines which extend outwardly from the container through the sidewalls of the float-glass installation for purposes of circulating refrigerant through the container. Another known technique in cooling the ribbon of glass contemplates the penetration of the float-glass installation by a plurality of pipes extending entirely across the enclosed space from one sidewall to the other. Each pipe provides a path for circulating refrigerant. Also, it is known in the prior art to extend a plurality of pairs of pipes through a sidewall of a float-glass installation in a manner that the paired pipes, supported in cantilever fashion, are located above the ribbon of glass. The paired pipes may extend into the space above the ribbon of glass and molten bath from one or both sidewalls, as described in German Patent Specification No. 1 596 430.

In each of the prior art, the cooling pipes or the connecting lines to the cooling container providing a conduit for cooling material extend over the marginal regions of the ribbon of glass, regions which heretofore have been discussed as being more effected by heat loss through the sidewalls of the installation than the mid-region of the ribbon. Therefore, to obviate any cooling to the marginal regions, regions where cooling normally is not desired, the cooling pipes and connecting lines generally have been enclosed by a thermal insulation barrier in the form of a layer of insulating material, such as asbestos. In the prior art, the thermal insulation barrier is secured in place.

It has been found that securement of a thermal insulation barrier either on the cooling pipes or connecting lines occasionally may be detrimental to the successful implementation of the float-glass procedure. Thus, if the width of the ribbon of glass to be produced either is increased or decreased from that width of ribbon normally acted upon, then it may be that the length of the region along the cooling pipes or connecting lines provided with thermal insulation barrier either is too short or too long for the new condition. Also, in the prior art float-glass installations including a plurality of pairs of pipes which extend into the space above the ribbon of glass and molten bath, it may be that the pairs of pipes extend too far or do not extend far enough into the space for the new conditions. In this connection, the pairs of pipes either must be extended further into the space or retracted from the space. However, such movement results in movement or shift of the transition point between the cooling zone and the insulated zone. Such movement or shift of the transition point may also result in undesirable side effects. The undesirability of a cooling container of fixed dimension is even more pronounced as the width of the ribbon of glass or product is changed.

The present invention is directed to cooling apparatus which overcomes the problems and disadvantages of the prior art both discussed and as known to exist in the prior art. In general terms the present invention is directed to cooling apparatus comprised of conduit means for circulating a flow of cooling medium for cooling a ribbon of glass and insulation means disposed as a sleeve about and secured to the conduit means in a manner that the position of the transition point, and in fact a transition zone between a cooling region and a heat-insulated region is capable of change in location. Thus, a ribbon of glass of any particular width as may be produced within the float-glass installation may be cooled within the region of its axis to eliminate or substantially eliminate detrimental temperature gradients across the ribbon from the region of the axis outward toward its edges.

SUMMARY OF THE INVENTION

According to the invention, the insulation means providing heat insulation around the conduit means which in the preferred embodiment is formed by a pair of pipes, is designed as a sleeve capable of movement relative to the paired pipes. The paired pipes of the conduit means and the sleeve of the insulation means extend through one sidewall of the float-glass installation into an enclosed space. The conduit means is adapted to extend above at least a portion of the width of a ribbon of glass moving on a molten bath and the sleeve may be relocated lengthwise along the conduit means either to extend further into the space or to be retracted toward the sidewall as may be required by the particular fabrication procedure, that is, the width of the ribbon of glass being fabricated. Each conduit means and insulating means extend through the sidewall in cantilever fashion, and each insulating means is sealed both around the opening into the space and to the conduit means.

The structure of the present invention makes it possible to influence the temperature profile across the ribbon of glass in a direction transverse to the axis of movement through the float-glass installation. By influencing the temperature profile, possible during all phases of the manufacturing process, it is possible to control the process with a significant degree of criticality. Thus, should control of the process be required, it is only necessary to shift the sleeve of the insulation means relative to the pair of pipes of the conduit means, or shift both the pair of pipes and insulation means relative to one another and to the sidewall.

According to the invention, the pair of pipes of the conduit means extend into the float-glass installation through at least one sidewall to a point substantially at the midpoint of the ribbon of glass. Further, according to the invention it also is contemplated that the pair of cooling pipes be capable of relocation relative to the mid-point, that a plurality of pairs of pipes extend into the float-glass installation at spaced locations along the sidewall, and that a plurality of pairs of pipes extend into the float-glass installation at spaced locations along each sidewall. In the latter possibility according to the invention, relocation of the pairs of pipes will result in a change in the amount of overlap of the end regions of adjacent cooling pipes. In all forms of the invention, however, it is particularly practical to change the relative location of the sleeve of the insulating means for purposes as discussed. The capability of independent adjustment of the conduit means and insulation means without any necessity to dismount the conduit means or to change its position is an important aspect of the present invention.

In one particularly advantageous form of the invention, the insulation means is formed by a cover which preferably is maintained at a distance from the pair of pipes of the conduit means. The cover is formed of metal, and an insulating barrier is disposed between the cover and the pair of pipes. The insulating barrier may be a layer of mineral insulating fibers.

In another practical embodiment of the invention, the cover likewise may be formed of metal and a skirt or inner cover in the form of a rigid wire grid or wire mesh is disposed about the conduit means. The skirt has a dimension slightly larger than the outer dimension of the pair of pipes and preferably is located between the pipes and the layer of mineral insulating fibers. The skirt preferably is structured to act as a bearing surface to slide with relative ease along the pair of pipes. A skirt of this form may undergo distortion as a result of the high temperatures to which it is exposed, but that distortion will not materially impair the mobility of the skirt.

In a particularly advantageous embodiment of the invention the cover of the insulation means is designed to taper from a region at the termination of the insulation barrier toward the distal ends of the pipes within the float-glass installation. The tapering of both the top and bottom walls as well as the sidewalls of the cover, and consequently the reduction in the width of the air barrier between the pipes and the cover, insures a gentle and steady transition zone between the cooling region and the insulated region of the conduit means. This enhances the influence of the cooling apparatus on the temperature profile across the ribbon of glass.

BRIEF DESCRIPTION OF THE DRAWING

Further details and advantages may be appreciated from the description as to the best mode for carrying out the invention, which description may be considered with the figures of drawing, as follows:

FIG. 2 is a perspective view, somewhat enlarged from that of FIG. 1, of insulating means and conduit means forming the cooling apparatus; and FIG. 3 is a view of the structure of FIG. 2 as seen in vertical section.

DESCRIPTION OF THE PREFERRED EMBODIMENT

Figure 1:
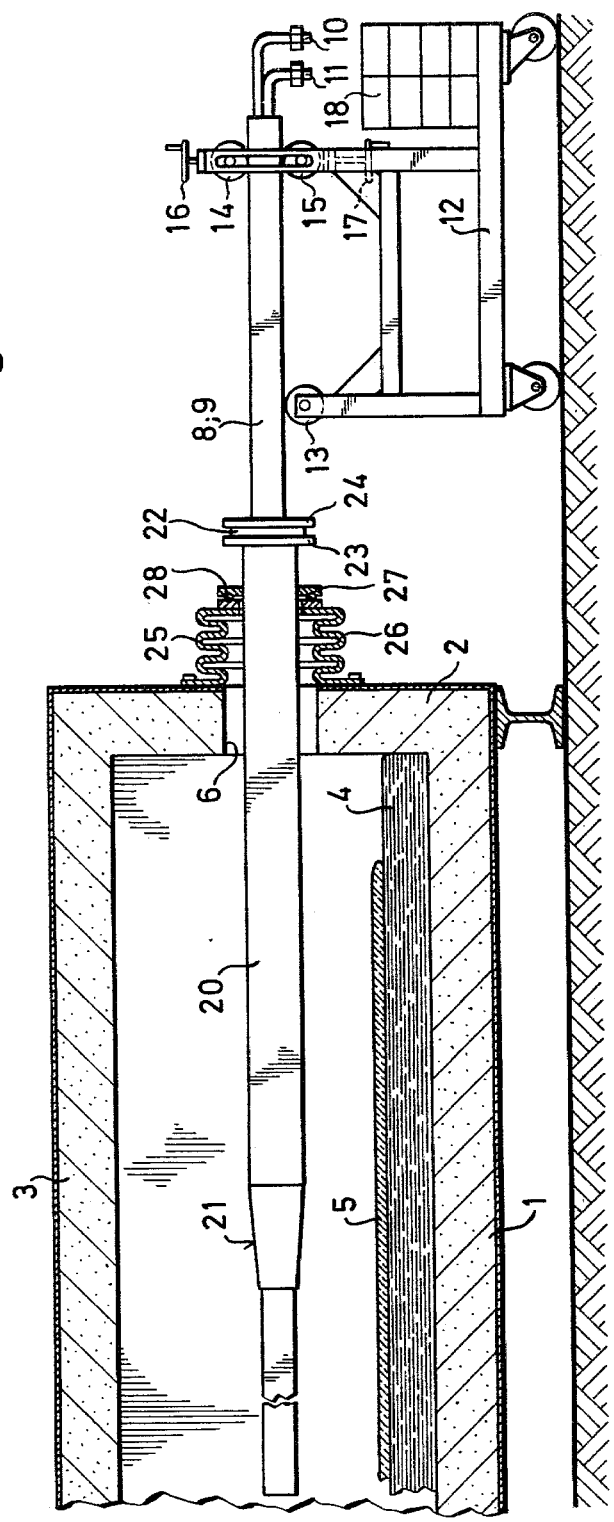
FIG. 1 is a partial view in elevation and partially in section of a cooling apparatus and float-glass installation according to the present invention.

The float-glass installation as seen in FIG. 1 includes a float-bath enclosure in the form of a furnace having a floor 1, sidewall 2 (only one sidewall is shown), ceiling 3 and an end wall (neither wall is clearly shown) at the upstream and downstream ends of the enclosure. The floor, sidewalls, ceiling and end walls may be formed of a refractory material or any other material as may be commercially used in installations of the type considered herein. The floor, sidewalls and the other structure of the float-bath enclosure may be supported by a casing, as illustrated in FIG. 1. The casing is supported on a working surface by means of a plurality of legs (only a single leg is illustrated) in the form of an I beam which may be disposed below and along each sidewall.

Structure (not shown) is provided in the upstream end of the float-bath enclosure for feeding molten glass into the enclosed space and structure (also not shown) is provided at the downstream end of the float-bath enclosure for removing a ribbon of glass 5 following movement from the upstream to the downstream end. A bath 4 of molten metal, such as tin, serves to support the ribbon of glass. This construction and the procedure of manufacture of float glass is well-known.

A plurality of openings 6 are provided along the length of sidewall 2 or both sidewalls, as desired. The openings provide an access for entry of cooling apparatus into the enclosed space. Normally, the molten glass which is introduced into the float-bath enclosure at the upstream end is at a temperature which may exceed 1000° C. However, the ribbon of glass which is removed from the float-bath enclosure at the downstream end should be at a temperature of about 600° C. It is the function of the cooling apparatus entered into the float-bath enclosure at a plurality of locations along a single sidewall to extend toward the other sidewall, or in an arrangement whereby one family of cooling apparatus extends into the float-bath enclosure from one sidewall and a second family of cooling apparatus extends into the float-bath enclosure, to effect the aforementioned degree of cooling. The number of cooling apparatus is governed by desired operating conditions. For the purposes of the present description, only a single cooling apparatus will be discussed since all of the cooling apparatus is considered identical.

The cooling apparatus is formed by means including a pair of pipes 8, 9 disposed in side-by-side relation. An end of each pipe, that is the end which extends into the float-glass enclosure, carries a connector for connecting the pipes together. The other end of each pipe is open. As illustrated, the pipes are of rectangular cross section and juxtaposed along the sidewall of minor dimension thereby to present the wall of major dimension toward the ribbon of glass to maximize the cooling surface. Pipes of other cross section may be utilized in the practice of the invention, but pipes of rectangular cross section are preferred. A connector including a connecting stub 10 and a connector including a connecting stub 11 is fluidly attached to the other or open end of the respective pipes. Cooling medium is supplied to one pipe and withdrawn from the other pipe after having traversed the length of the respective pipes for cooling. The cooling medium may be in the form of a refrigerant or it may be cold water, and typically the cooling medium may be flowed in a closed path to return to the first-mentioned or inlet pipe after latent heat acquired from the cooling process has been removed.

A carriage 12 supports the cooling apparatus in cantilever fashion. The carriage includes a frame supported by a plurality of rollers for movement along a supporting surface relative to the float-glass installation. The frame provides a pair of stanchions at the end which faces the float-glass installation. An axle is supported across the stanchions and a roller 13 is supported for movement on the axle. The frame provides a second pair of stanchions near the other end. A bracket in a form of a pair of spaced plates having an elongated, vertical slot is supported by the second pair of stanchions. A pair of axles extend into the slot, one above the other, and each axle supports a roller. Thus, roller 14 is supported for movement on one axle and roller 15 is supported for movement on the other axle. Handwheels 16 and 17 are carried by the bracket for relocating each axle within the confining slots. Movement of the handwheels will result in a pivoting of the cooling apparatus in a vertical plane about roller 13 thereby to change its angle of inclination toward the float-glass installation. The handwheels 16, 17 and rollers 14, 15 will be moved equally to maintain support of the cooling apparatus. Each of the stanchions is rigidly supported on the carriage and a plurality of counterweights 18 are provided to balance the cantilever mounting arrangement.

Referring to FIGS. 2 and 3, the insulation means is in the form of a cover 20 which surrounds the pipes of the conduit means throughout a length to extend with the pipes from a position outside the float-glass installation into the enclosed space thereby to permit required relative movement of the sleeve along the pipes and to assure that the cover may be sealed both around the opening(s) 6 on the outside of the float-glass installation and to the pipes. The cover has a cross section throughout the major portion of its length which corresponds to that of the pipes 8, 9 but of slightly larger dimension to accommodate structure between the inner surface of the cover and the pipes 8, 9 as will be discussed. A length 21 at the end of the cover extending into the float-glass installation tapers along the top, bottom and sides toward the surface of the pipes 8, 9 to substantially close the end at the junction with the pipes. By means of the taper, the cover decreases in cross section from a region of mechanical insulation to provide a length of transition zone comprised of an air barrier from a transition point at the terminus of the mechanical insulation to be described. The transition zone will provide a steadily increasing cooling effect toward the non-insulated length of pipes 8, 9.

Cover 20 is connected with the pipes 8, 9 of the cooling apparatus by means of a pair of flanges 23, 24 (see FIG. 1) which are clamped together by a plurality of machine screws (not shown). A sealing device 22 located between the flanges provides a seal between the cover and the pipes when compressed between the flanges. The cover is also sealed to the sidewall 2 of the float-glass installation at each of the passages 6. To this end, a bellows 25 has one end secured to the casing of the float-glass installation around each passage, and the other end is secured to the cover. The sealing arrangement is similar to that which has been discussed. Thus, a pair of flanges 26, 27 are clamped together to compress a sealing device 28 located therebetween. Securement of the flanges, one of which is connected to the bellows, may likewise be accomplished by machine screws (not shown).

The construction of the cover perhaps is best shown in FIGS. 2 and 3. Thus, referring again to these figures, a skirt or inner cover 30 is located about the pipes 8, 9. The skirt is substantially coextensive in length with the outer cover 31. More particularly, the skirt extends throughout the length of the outer cover to the transition point at which the outer cover tapers toward the pipes within the enclosed space of the float-glass installation. The skirt may be in the form of a wire grid 30 preferably having an inherent degree of flexibility thereby to permit sliding receipt about the pipes and an inherent degree of yieldability to undergo any distortion which may result from the effect of heat. The easy sliding nature of the wire grid and its capability to undergo distortion under the aforementioned condition ensures that the wire grid will act as a bearing surface in the longitudinal adjustment of the cover relative to the pipes 8, 9.

The outer cover 31 is formed of steel sheet and the inner cover 30 may be formed of a steel mesh. An insulation barrier including a layer or matting of insulation material preferably is located between the pipes 8, 9 and the outer cover. Thus, the outer cover which becomes red hot in operation, and in practice may assume the temperature of the environment into which it is received, is suitably insulated from the pipes 8, 9 so that the desired effects of cooling is limited to the non-insulated length of the pipes and the length of pipes within the length 21, or transition zone of the cover, along which the cooling effect increases. In addition to the advantage that the cooling effect along the pipes within the area of insulation barrier is not lost, a further advantage consists of the fact that, in the region of the insulation barrier there is substantially no condensation of vaporized products and release of those products as droplets onto the glass band. Faults along the glass band as a result of such droplets are avoided.

The layer or matting of insulation material may comprise mineral fibers and preferably is coextensive in length with both the outer and inner covers to the transition point. It is contemplated, also, that the insulation barrier may comprise an insulating air layer. To accomplish this purpose, the inner cover 30 may be disposed at a small distance from the pipes 8, 9. A plurality of spacers (not shown) arranged at intervals along the inner cover, or similar structure, may be provided to maintain a spacing and permit maintenance of the air layer. The spacers may be integral with the wire mesh or formed as a separate body.

In operation, individual cooling devices which penetrate the float-glass installation, sealed by insulation means at each of the passages 6, are located relative to the sidewalls of the installation. Locating movement may be carried out by movement of each carriage 12. In the locating of each cooling device, it oftentimes is necessary to locate the cover of the insulating means as well. Location or relocation of the cover may be accomplished with relative ease, and during the manufacturing procedure, merely by release of the compression seals 22, 28, by unclamping flanges 23, 24 and 26, 27, respectively. When the cover has been properly located or relocated, the compression seals are secured, once again. While the discussion has proceeded with a description of compression seals, flanges and a bellows other forms of sealing arrangement may be employed subject, within the context of this invention, to the requirement that the cover be capable of release from the cooling pipes to permit relative movement and then, once again, connected and sealed to the cooling pipes.

I claim:

1. A cooling apparatus for use with an installation in the formation of a continuous ribbon of glass that floats on a molten bath in a substantially enclosed space between an inlet for molten glass and an outlet through which said ribbon is removed, said cooling apparatus comprising at least one conduit means adapted to extend through one wall of said installation into said space, above at least a portion of the width of said ribbon and in an orientation substantially perpendicular to the path of movement of said ribbon toward said outlet, said conduit means providing a path of circulation for a cooling medium for cooling said ribbon as it moves, and insulation means on said conduit means likewise adapted to extend through said one wall and along said conduit means to a location spaced from its distal end, said insulation means being disposed as a sleeve around said conduit means thereby to thermally insulate said conduit means and substantially localize the cooling effect of said cooling medium to the region of said ribbon below the non-insulated length, said insulation means being movable lengthwise relative to said conduit means to increase or decrease the non-insulated length, and means for sealing said insulation means both to said wall outside said installation to seal the entry to said space and to said conduit means.

2. The cooling apparatus of clam 1 wherein said conduit means comprises a pair of pipes juxtaposed to one another along their length and connected together at the distal ends whereby said cooling medium flows into and along one pipe and out of the other pipe.

3. The cooling apparatus of claim 1 wherein said insulation means comprises a cover surrounding said conduit means, and a mechanical insulation barrier between said conduit means and said cover.

4. The cooling apparatus of claim 3 wherein said cover is formed by a metallic member and said insulation barrier is formed by a layer of mineral insulating fibers.

5. The cooling apparatus of claim 3 wherein said insulation means further includes a member located between said conduit means and said insulation barrier, said member providing a surface for ease of movement of said insulation means relative to said conduit means.

6. The cooling apparatus of claim 5 wherein said member is formed of a wire mesh.

7. The cooling apparatus of claim 5 or 6 including a plurality of spacers supported around said conduit means, said spacers maintaining said member at a distance from said conduit means whereby said insulation barrier is formed by a layer of mineral insulating fibers on one side of said member and an insulating air layer on the other side of said member.

8. The cooling apparatus of claim 4 wherein said mechanical insulation barrier extends along said insulation means throughout a major portion of its length from which point said cover tapers circumferentially toward said conduit means.

9. In an installation for the formation of a continuous ribbon of glass within a substantially enclosed space including a pair of spaced sidewalls, a floor, a ceiling, an inlet for molten glass adapted to float on a molten bath and an outlet through which said ribbon is removed, the combination including cooling apparatus comprising at least one conduit means adapted to extend through at least one sidewall of said installation into said space, above at least a portion of the width of said ribbon and in an orientation substantially perpendicular to the path of movement of said ribbon toward said outlet, said conduit means providing a path of circulation for a cooling medium for cooling said ribbon as it moves, and insulation means on said conduit means likewise adapted to extend through said one sidewall and along said conduit means to a location spaced from its distal end, said insulation means being disposed as a sleeve around said conduit means thereby to thermally insulate said conduit means and substantially localize the cooling effect of said cooling medium to the region of said ribbon below the non-insulated length, said insulation means being movable lengthwise relative to said conduit means to increase or decrease the non-insulated length, and means for sealing said insulation means both to said sidewall outside said installation to seal the entry to said space and to said conduit means.

10. The combination of claim 9 wherein a first plurality of said conduit means extend through said one sidewall at spaced locations between said inlet and outlet.

11. The combination of claim 10 wherein a second plurality of said conduit means extends through the other sidewall, each of said conduit means extending to the region of the axis of said ribbon and said conduit means of said second plurality disposed between adjacent conduit means of said first plurality.

12. The combination of claims 9, 10 or 11 including a carriage for supporting the end of said conduit means outside of said space, means carried by said carriage for adjusting the location of the end of said conduit means in said space and its disposition relative to said ribbon.

* * * * *